Aug. 1, 1961     M. RUGGIERO     2,994,563
EMERGENCY BRAKE SYSTEM
Filed March 19, 1957
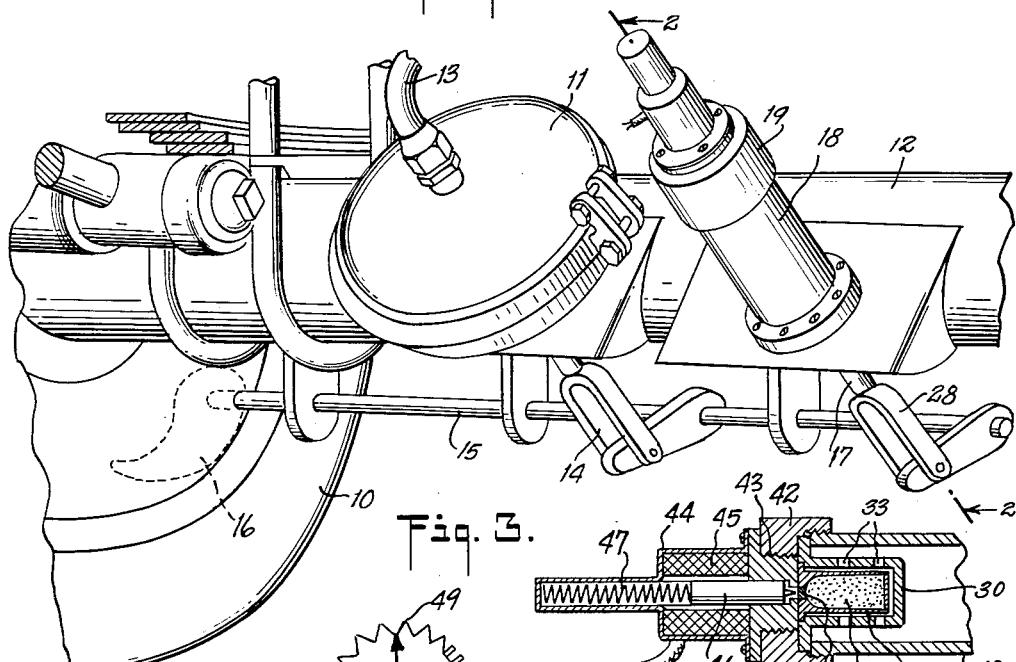
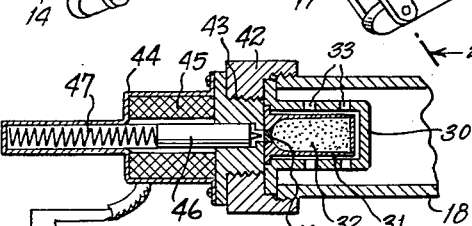
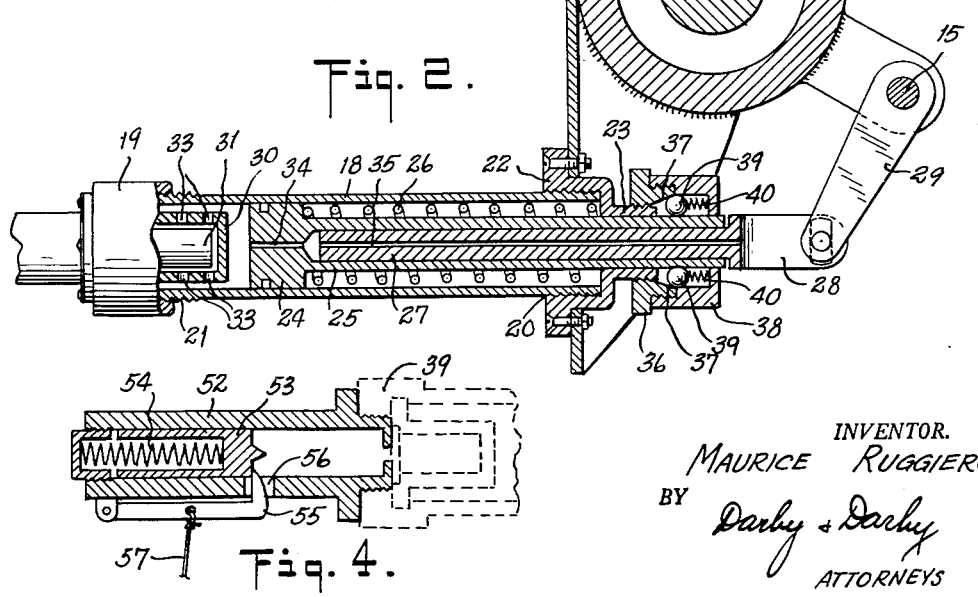
INVENTOR.
MAURICE RUGGIERO
BY Darby & Darby
ATTORNEYS

United States Patent Office 2,994,563
Patented Aug. 1, 1961

2,994,563
EMERGENCY BRAKE SYSTEM
Maurice Ruggiero, 128 Edwards St., New Haven, Conn.
Filed Mar. 19, 1957, Ser. No. 647,092
11 Claims. (Cl. 303—2)

This invention relates to vehicle braking systems and more particularly to an emergency braking system in the event of failure of the normal system.

Hydraulic and pneumatic braking systems of modern vehicles are designed to give trouble-free service over an extended period of time. However, there is always the possibility that without any warning such systems will either completely fail or become partially inoperative. It is therefore advantageous to provide an auxiliary braking system for emergency use. In fact, the Interstate Commerce Commission as well as other Government Agencies require that emergency braking devices be installed on tractor-trailer combinations and on trucks by interstate freight carriers. Reference here is made to Motor Carrier Safety Regulations, 49 C.F.R. 193.43, 193.50 and 193.51 as amended June 30, 1956.

Hydraulic and pneumatic systems operate upon the principle of air or fluid pressure to transmit an impulse from the brake pedal to the braking means within each wheel, and is dependent upon the absolute maintenance of a pressure sure system. Should any leak, no matter how small, occur in any portion of the system, the necessary pressure will fall and the system will fail. Leakage of pressure is likely to occur at any place within the system including the brake cylinder, or the linkage and couplings between the brake pedal and this cylinder. These systems are most likely to fail under conditions of use when they are subject to extreme pressures.

In tractor-trailers and vehicles of a similar type, a pressure sure system cannot be maintained when the trailer is accidentally separated from the tractor. When such separation occurs the trailer is frequently left brakeless and incapable of being stopped. Other reasons for failure of braking systems are all too common to be discussed here at length.

It is therefore an object of this invention to provide an emergency braking system completely separate from the normal system and providing instantaneous application in the event of an emergency.

It is another object of this invention to provide a system that may be operated mechanically, electrically, or electro-mechanically by the driver of the vehicle and which is operable automatically and completely upon the separation of the trailer from its tractor.

It is still another object of my invention to provide a supplementary emergency braking system for existing vehicles with substantially no change in the normal braking system thereof, and which can be used equally well in vehicles having normal pneumatic or hydraulic systems.

It is yet another object of this invention to provide an emergency braking system that when once applied will not permit the movement of the vehicle with defective brakes.

These and other objects of my invention will become apparent in the following description and from the drawings illustrating this invention.

In the drawings,

FIG. 1 is an isometric view of a portion of the undercarriage of a vehicle showing installation of this invention in conjunction with a normal breaking system;

FIG. 2 is a longitudinal cross-sectional view of the device of this invention taken along line 2—2 of FIG. 1;

FIG. 3 is a longitudinal cross-sectional view of an electrically operated firing mechanism;

FIG. 4 is a longitudinal cross-sectional view showing a mechanical firing mechanism.

The installation and function of standard braking systems is too well known for an extended discussion here; however, a portion of this system as attached to a single wheel 10 is shown in FIG. 1 merely as a frame of reference to which the device of this invention is to be applied. Normally a hydraulic or pneumatic brake cylinder 11 is mounted upon wheel axle 12 and is linked by a hose 13 to the centrally operated brake pedal under the driver's control. A piston 14 reciprocally mounted within the cylinder 11 is coupled to brake axle 15 and transmits a braking motion to the shoe 16, under a pressure impulse from the driver.

The device of this invention comprises essentially a piston 17 contained in a cylindrical barrel housing 18 and which is coupled to the brake axle 15 and the brake shoe 16. The piston 17 is actuated by the driver or automatically by firing a cartridge, producing a high pressure gas, contained within a combustion chamber 19 in the housing 18. This entire device is mounted on the wheel axle 12 in parallel relationship to the normal braking system and in similar manner to it.

As is shown in detail in FIG. 2, the device comprises a hollow cylindrical barrel 18 having externally threaded portions at both its muzzle end 20 and its breach end 21. A necked-down cap 22 forming a hollow tubular extension 23 is threaded onto the muzzle end 20. Slidably mounted within the barrel 18 is a piston head 24 having unitarily formed with it a substantially tubular piston rod 25 extending outwardly from the barrel 18 in slidable engagement with the interior walls of the tubular extension 23. A spring 26 is mounted within the cylinder 18 surrounding the piston rod 25 between the internal shoulders of the cap 22 and the rear face of piston 24 so as to retain the piston 24 and rod 25 fully within the barrel, breachward, under conditions of rest.

Slidably telescoped within the tubular piston rod 25 is a push rod 27 having a forked coupling 28 at its outward end. The forked coupling 28 is pivotally attached to arm 29 which is fixed to the brake axle 15. It will be observed that the push rod 27 freely reciprocates within the piston rod 25 along its length so as to permit the brake axle 15 to rotate independently without interference from or to the device of this invention, allowing the brake to be applied by the normally operating brake system.

The push rod 27 and piston rod 25 formation as shown is one mechanical form of lost motion means. It is by no means the only method by which the brake may be normally operated but still be linked to the emergency system as here disclosed, and modifications may be easily made.

At the breach end 21 of the cylindrical barrel 18 a combustion chamber 30 is seated in which is held a cartridge 31 containing a slow burning explosive powder 32 similar to the type used in the production of commercial ammunition. Ports 33 are provided within the walls of the chamber 30 for the flow of gas outwardly into the barrel 18. Narrow bores 34 and 35 are formed through the center of the piston 24 and push rod 27 respectively providing escape ports for freeing excess gas from the chamber 18 and to allow the free movement of the push rod 27 within the piston rod 25.

These ports are not an absolute necessity as it is quite obvious that other means may be provided to exhaust the gas from the cylinder. For example, holes may be placed in the walls of the cylinder 18.

In operation in order to apply the brake shoe 16 to the wheel 10, the cartridge 31 is fired by the driver or automatically as the case may be by any of the means more fully described below. The high pressure gas escaping through ports 33 within chamber 30 forces the piston 24 and piston rod 25 outwardly through the muzzle end 20 of barrel 18. The piston rod 25 carries with it the push rod 27 causing a rotary motion in axle 15 enforcing a braking action between the brake shoe 16 and the wheel 10. It will be observed that the ports 34 and 35 may have an additional function in that they act as a safety feature preventing the accumulation of excess pressure and preventing a sudden application of the brake due to too much force upon the piston head 24.

Once the cartridge is fired and the brake applied in the manner shown above, the piston 24 and rod 25 are held in their extended position continuing the braking effect due to the locking device provided at the muzzle end 20 of cylinder 18. Threaded to the tubular extension 23 is a washer 36 having an internal wall 37 tapered outwardly and to which is externally threaded a cap 38. Within the hollow cavity formed by cap 38 and tapered washer 36 are ball bearings 39 and retaining springs 40 which prevent the rearward movement of the piston rod 25, due to the wedging action of the ball bearings 39 between the tapered wall 37 and the piston rod 25.

It will be noted that this locking device is most effective in maintaining a constant and undiminished braking force and contributes to a braking device superior to those that rely upon sustained gas pressure for a constant braking force. In this device once the piston has been fired, the gas pressure may be decreased at will and in fact is rapidly exhausted by its escape through ports 34 and 35, yet the piston rod 25 will not retract. When the braking power is no longer required, the ball bearings 39 are released by rotating the cap 38 or the tapered washer 36 so as to remove the wedging action.

This locking device in addition is a most important safety feature. Once the emergency brake is applied the vehicle can no longer be driven unless that brake is manually released, reset and reactivated. The vehicle is thus prevented from knowingly being driven with faulty brakes.

However, this use of such locking means as is shown does not eliminate the possibility that the braking system of this invention precludes the use of sustained pressure to enforce the braking action. It is obvious that the elimination of the escape port within the piston will permit the retention of sufficient pressure within the cylinder to allow a continuous braking action regardless of the use of a separate locking action.

The cartridge firing means is shown in detail in FIG. 3 where a cartridge 31 filled with explosive powder 32 and primer 41 are seated within the combustion chamber 30. Threaded onto the end of the cylinder 18 and holding the chamber 30 and cartridge 31 firmly in place is a cap 42 having a threaded bore 43 through the center thereof. A firing pin housing 44 is threaded into the internal bore of the cap 42 and has mounted therein a solenoid 45, a firing pin 46 and a spring 47. The solenoid is electrically connected to a control knob 48, rheostat 49 and a source of current 50 within the driver's cab.

When the cab and trailer are connected, an electrical connection is made at 51 and the control knob is set at position A of the rheostat 49 allowing a maximum current to flow through the system and energize the solenoid 45 which causes the firing pin 46 to move against the spring 47 thus cocking the device.

In the event of an emergency, the control knob is turned to position B immediately breaking the electrical circuit, deenergizing the solenoid 45 causing the firing pin 46 to be rammed into the primer 41 by the force of the depressed spring 47. The explosive charge 32 is ignited by the flash of the primer 41 and the piston activated.

In the event the tractor is separated from the trailer the connection made at 51 is automatically broken. The resultant loss in current to the solenoid 45 has immediate effect upon the firing pin 46. It is thus obvious that this firing method is advantageous in that it may be both driver controlled and automatic simultaneously. It will be noted that the system here shown has application to a tractor-trailer type of vehicle. However, the same system is applicable and may be used with any other type of vehicle without any modification whatsoever save that of making a permanent connection at 51 in place of the one shown.

In the event that it is desired to remove the source of current 50 or to remove the trailer from the cab or otherwise deactivate the brake system the control knob 48 is moved through the rheostat 49 to position C, thus slowly decreasing the flow of current and releasing the firing pin 46 without it firing the primer 41.

A mechanical system by which the firing pin is activated is shown in FIG. 4 in which a firing pin housing 52 is threaded into the internal bore or cap 39 and contains a firing pin 53 and spring 54. A retaining pin or sear 55 is pivotally mounted on the outer wall of the firing pin housing 52 having the pin extending through a hole 56. The firing pin is pre-loaded or cocked by depressing the spring 54 and inserting the retaining pin 55 in position. A flexible cable 57 attached to the retaining pin 55 permits the driver to control the firing of this device.

In an emergency the cable is pulled by either the driver or in the case of a tractor-trailer type vehicle, by the action of the tractor separating from the trailer releasing the retaining pin 55 and allowing the spring 54 to ram the firing pin 53 into the primer 41. It may sometimes be desirable to form the mechanically activated device so as to avoid the pre-cocking of the firing pin, so that the system would have less likelihood of being accidentally fired. By a slight modification the flexible cable 57 may be directly attached to the firing pin 53 and retaining pin 55 eliminated so that by pulling the cable the firing pin may be retracted and then released leaving it unnecessary to load the device prior to its use.

It will be noted that once this device is used it is quite easy to reload and reset. By unscrewing the firing pin housing 44 or 52 in either the electrical or mechanical firing devices the old cartridge 31 may be replaced by a new one and in case of the mechanical device, the firing pin 53 may be quickly depressed and cocked. This reloading operation can easily be accomplished at the same time that the piston rod 25 is released from the wedging action of the ball bearings 39 as described above. These methods facilitate the reuse of this device, while effectively preventing the use of a defective vehicle without adequate emergency brakes.

This invention has been described in relation to a single wheel of a vehicle. It is obvious that this invention may be placed equally effectively at all of the wheels of a vehicle or at selected pairs and by proper electrical or mechanical connection made in any of the usual manners, be made to operate simultaneously so as to brake each of the wheels at the same time.

It is further obvious that this invention may be modified in many respects, for example, the cylindrical housing has been shown as a barrel type. This invention may equally be practiced by having a different shaped cylinder as at 11 by modifying the piston, rods, couplings, etc. The combustion chamber and firing devices may equally be modified and yet be within the spirit of this invention, as can the other elements as shown within the body of this specification. Therefore, it is desired not to be bound by the specification but to be bound only by the claims as appended hereto.

What is claimed is:

1. In a motor vehicle having wheels and including internal wheel brakes, brake actuating linkage and means for normally operating said brake, an emergency braking system for at least one of said wheels comprising in combination, a cylinder, a piston slidably mounted therein, a substantially tubular piston rod mounted within said cylinder along its longitudinal axis and having one end attached to said piston, a push rod slidably telescoped within said piston rod having an end extending therefrom and coupled to said brake linkage, a combustion chamber communicating with said cylinder, a cartridge containing an explosive charge located within said chamber and means for firing said cartridge to effect movement of said piston whereby said push rod is displaced causing said brake to be applied but otherwise allowing application of said brake by said normal means.

2. In a motor vehicle having wheels and including internal wheel brakes, brake actuating linkage and means for normally operating said brake, and emergency braking system for at least one of said wheels comprising in combination, a cylinder, a piston, slidably mounted therein, a substantially tubular piston rod mounted within said cylinder along its longitudinal axis and having one end attached to said piston, a push rod slidably telescoped within said piston rod having an end extending therefrom and coupled to said brake linkage, a combustion chamber communicating with said cylinder, a cartridge containing an explosive charge located within said chamber, a firing pin operatively mounted adjacent said combustion chamber to strike said cartridge, control means for operating said firing pin causing said cartridge to explode to effect movement of said piston and said piston rod whereby said push rod is displaced causing said brake to be applied, but otherwise allowing application of said brake by said normal operating means.

3. An emergency braking system as claimed in claim 2 in which said control means for operating said firing pin comprises an electromagnet mounted adjacent said firing pin, a source of electric current, means connecting said source of current to said electromagnet, control means including a switch and rheostat for varying the flow of current to said electromagnet to effect movement of said firing pin.

4. An emergency braking system as claimed in claim 3 in which said control means for operating said firing pin is further characterized in that said firing pin is caused to strike said cartridge by a failure of current to flow to said electromagnet.

5. In a motor vehicle having wheels and including internal wheel brakes, brake actuating linkage and means for normally operating said brake, an emergency braking system for at least one of said wheels comprising in combination a cylinder, a piston slidably mounted therein, a substantially tubular piston rod mounted within said cylinder along its longitudinal axis and having one end attached to said piston, a push rod slidably telescoped within said piston rod having an end extending therefrom and attached to said brake linkage, a combustion chamber communicating with said cylinder, an explosive charge located within said chamber, means for firing said explosive charge to effect a forward movement of said piston and piston rod, means mounted on said cylinder for engaging and locking said piston in its displaced position whereby said push rod is displaced causing said brake to be fixedly applied but otherwise allowing application of said brake by said normal means.

6. An emergency braking system as claimed in claim 5 wherein there is provided means for exhausting the resultant product of said explosive charge after affecting movement of said piston and piston rod.

7. In a motor vehicle having wheels and including internal wheel brakes, brake actuating linkage and means for normally operating said brake, an emergency braking system for at least one of said wheels comprising in combination a cylinder, a piston slidably mounted therein, a substantially tubular piston rod mounted within said cylinder along its longitudinal axis and having one end attached to said piston, a push rod slidably telescoped within said piston rod having an end extending therefrom and attached to said brake linkage, a combustion chamber communicating with said cylinder, an explosive charge located within said chamber, means for firing said explosive charge to effect a forward movement of said piston and said piston rod, an annular tubular extension formed on said cylinder surrounding said piston rod, said extension having an internal wall conically tapered forming an angular cavity between said extension and said piston rod, a spherical ball mounted in said cavity, spring means for causing said ball to frictionally engage said tapered wall and said piston rod preventing a rearward movement of said piston rod, whereby said push rod is displaced causing said brake to be fixedly applied but otherwise allowing application of said brake by said normal means.

8. An emergency braking system as claimed in claim 7 wherein said annular tubular extension is removably mounted on said cylinder.

9. An emergency braking system as claimed in claim 7 wherein means are provided for freeing the resultant product of said explosive charge after effecting movement of said piston and piston rod.

10. An emergency braking system as claimed in claim 7 wherein ports are provided within said piston and said push rod for freeing said resultant product of said explosive charge after effecting movement of said piston and push rod.

11. An emergency braking system as claimed in claim 7 wherein ports are provided within said cylinder for exhausting said resultant product of said explosive charge after effecting the movement of said piston.

References Cited in the file of this patent

UNITED STATES PATENTS

| | | |
|---|---|---|
| 1,210,444 | Fallek | Jan. 2, 1917 |
| 1,444,984 | Simmon | Feb. 13, 1923 |
| 2,124,407 | Stroup | July 19, 1938 |
| 2,261,220 | Brown | Nov. 4, 1941 |
| 2,645,313 | Schaadt | July 14, 1953 |
| 2,674,852 | Olman | Apr. 13, 1954 |
| 2,759,569 | Keehn | Aug. 21, 1956 |
| 2,776,734 | Hackett | Jan. 8, 1957 |
| 2,860,736 | Belsky | Nov. 18, 1958 |
| 2,873,579 | Safford | Feb. 17, 1959 |
| 2,903,848 | Mayhew et al. | Sept. 15, 1959 |
| 2,922,498 | Fleenor | Jan. 26, 1960 |
| 2,934,380 | Julier et al. | Apr. 26, 1960 |